(12) United States Patent
Haida et al.

(10) Patent No.: US 9,864,101 B2
(45) Date of Patent: Jan. 9, 2018

(54) POLARIZING FILM OBTAINED BY ACETOACETYL-MODIFIED PVA-BASED RESIN HAVING SPECIFIED MODIFICATION RATE

(71) Applicant: NITTO DENKO CORPORATION, Osaka (JP)

(72) Inventors: Nobuyuki Haida, Osaka (JP); Shusaku Goto, Osaka (JP); Takeharu Kitagawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/218,083

(22) Filed: Jul. 25, 2016

(65) Prior Publication Data
US 2016/0370502 A1    Dec. 22, 2016

Related U.S. Application Data

(63) Continuation of application No. 13/907,391, filed on May 31, 2013, now abandoned.

(30) Foreign Application Priority Data

Jun. 6, 2012 (JP) .................................. 2012-129014

(51) Int. Cl.
*G02B 1/04* (2006.01)
*G02B 5/30* (2006.01)
(Continued)

(52) U.S. Cl.
CPC ................ *G02B 1/04* (2013.01); *G02B 1/08* (2013.01); *G02B 5/3033* (2013.01); *G02B 5/3083* (2013.01); *G02F 1/133528* (2013.01)

(58) Field of Classification Search
CPC ... G02B 1/04; G02B 1/08; G02B 5/30; G02B 5/3016; G02B 5/3025; G02B 5/3033;
(Continued)

(56) References Cited

U.S. PATENT DOCUMENTS 4,388,375 A * 6/1983 Hopper et al. .......... B32B 27/08
156/229
5,631,051 A    5/1997 Ito
(Continued)

FOREIGN PATENT DOCUMENTS

CN    101261391 A    9/2008
JP    8-338913    12/1996
(Continued)

OTHER PUBLICATIONS

Japanese Office Action for 2012-129014 dated Sep. 24, 2013.
(Continued)

*Primary Examiner* — Stephone B Allen
*Assistant Examiner* — Ryan S Dunning
(74) *Attorney, Agent, or Firm* — Hauptman Ham, LLP (57) ABSTRACT

Provided a polarizing film which comprising a substrate and a PVA-based resin, wherein it has good adhesion between the substrate and the PVA-based resin to allow the PVA-based resin to become less likely to be peeled off from the substrate during stretching and/or conveyance, and exhibits excellent appearance, wherein the polarizing film is obtained by providing a layer of a PVA-based resin on a substrate and stretching the substrate and the PVA-based resin layer together. The PVA-based resin contains a modified PVA, wherein the modified PVA exists in an amount allowing a modification rate with respect to the entire PVA-based resin to be in a range of 0.04 mol % to 1.4 mol %.

9 Claims, 3 Drawing Sheets

(51) Int. Cl.
*G02B 1/08* (2006.01)
*G02F 1/1335* (2006.01)

(58) Field of Classification Search
CPC ... G02F 1/01; G02F 1/13; G02F 1/133; G02F 1/1333; G02F 1/1335; G02F 1/133528
USPC .............. 264/1.1, 1.31, 1.34, 288.4, 291; 359/483.01, 487.01; 428/1.1, 1.3, 1.31, 428/414, 480, 522; 524/557; 525/50, 61; 560/186
See application file for complete search history.

(56) References Cited

U.S. PATENT DOCUMENTS

| | | | |
|---|---|---|---|
| 5,747,121 A | 5/1998 | Okazaki et al. | |
| 5,830,953 A | 11/1998 | Nishikawa et al. | |
| 7,847,888 B2 | 12/2010 | Toyooka | |
| 8,043,714 B2 | 10/2011 | Hashimoto | |
| 2002/0065195 A1 | 5/2002 | Mitsuo et al. | |
| 2003/0178608 A1* | 9/2003 | Isozaki et al. | C08J 5/18 252/585 |
| 2006/0268208 A1* | 11/2006 | Murakami et al. | G02F 1/133528 349/117 |
| 2006/0292315 A1 | 12/2006 | Inagaki et al. | |
| 2007/0207277 A1 | 9/2007 | Mizushima et al. | |
| 2008/0224340 A1 | 9/2008 | Tsai | |
| 2010/0165262 A1* | 7/2010 | Nagase et al. | G02B 5/3033 349/96 |
| 2010/0209723 A1 | 8/2010 | Tanaka et al. | |
| 2010/0221455 A1 | 9/2010 | Kim et al. | |
| 2011/0300387 A1 | 12/2011 | Park et al. | |
| 2011/0315306 A1 | 12/2011 | Goto et al. | |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057107 A1 | 3/2012 | Kitagawa et al. | |
| 2012/0057231 A1 | 3/2012 | Goto et al. | |
| 2012/0057232 A1 | 3/2012 | Goto et al. | |
| 2012/0058291 A1 | 3/2012 | Kitagawa et al. | |
| 2012/0058321 A1 | 3/2012 | Goto et al. | |
| 2013/0100529 A1 | 4/2013 | Kitagawa et al. | |
| 2013/0114139 A1 | 5/2013 | Kitagawa et al. | |

FOREIGN PATENT DOCUMENTS

| | | |
|---|---|---|
| JP | 9-152509 | 6/1997 |
| JP | 9-316127 | 12/1997 |
| JP | 09-324095 | 12/1997 |
| JP | 2003-043257 | 2/2003 |
| JP | 2012-022250 | 6/2003 |
| JP | 2005-513521 | 5/2005 |
| JP | 2005-173440 | 6/2005 |
| JP | 2007-056102 | 3/2007 |
| JP | 2007-301986 | 11/2007 |
| JP | 2008-102189 | 5/2008 |
| JP | 2008-224758 | 9/2008 |
| JP | 2009-067861 | 4/2009 |
| JP | 2009-161761 | 7/2009 |
| JP | 2011128486 | 6/2011 |
| JP | 2011-227450 | 11/2011 |
| JP | 2012073563 | 4/2012 |
| JP | 2012103595 A | 5/2012 |
| KR | 10-2012-0032195 A | 4/2012 |
| TW | 201134906 A | 10/2011 |
| TW | 201219215 A | 5/2012 |
| WO | 03/052471 | 6/2003 |
| WO | 2010095905 A2 | 8/2010 |
| WO | 2010100917 A1 | 9/2010 |

OTHER PUBLICATIONS

European Search Report for 13170907.3 dated Oct. 21, 2013.
Japanese Office Action for application 2012-129014 dated Apr. 21, 2014.
Korean Office Action for application 10-2013-0063355 dated Jul. 10, 2014.
Taiwanese Office Action for Taiwan application No. 102119579 dated Dec. 26, 2014.
Chinese Office Action for application No. CN20131022583.8 dated Feb. 3, 2015.

* cited by examiner

FIG. 4

POLARIZING FILM OBTAINED BY ACETOACETYL-MODIFIED PVA-BASED RESIN HAVING SPECIFIED MODIFICATION RATE

CROSS-REFERENCE TO RELATED APPLICATION

The present application is a continuation of U.S. patent application Ser. No. 13/907,391 filed on May 31, 2013, which is based on and claims priority to Japanese Patent Application No. 2012-129014. The disclosures of above-listed applications are hereby incorporated by reference herein in their entirety.

TECHNICAL FIELD

The present invention relates to a polarizing film including a modified polyvinyl alcohol (PVA), and an optical laminate with the polarizing film. In particular, the present invention relates to a polarizing film comprising a substrate and a PVA-based resin provided on the substrate, wherein it capable of allowing the PVA-based resin to become less likely to be peeled off from the substrate during a stretching step or the like in a production process of the polarizing film, and obtaining excellent appearance, and an optical laminate with the polarizing film.

BACKGROUND ART

Recent years, many types of image displays, such as a liquid crystal display, a PDP (plasma display panel) and an organic EL (electroluminescence) display, have been developed. As for these image displays, in parallel with an enlargement in size of a screen, a reduction in thickness of the entire display is also being promoted.

As a component constituting an image display, there is an optical laminate with a polarizing film, for example, which is disposed on each of opposite sides of a liquid crystal cell in a liquid crystal display. Generally, the optical laminate comprises: a polarizing film obtained by causing a dichroic material to be absorbed in a layer of a PVA-based resin coatingly formed on a substrate (i.e., by impregnating, with a dichroic material, a layer of a PVA-based resin coatingly formed on a substrate) to thereby dye the layer, and subjecting the dyed layer to uniaxial stretching together with the substrate; and a protective layer disposed on each of opposite sides of the polarizing layer. A polarizing film obtained by subjecting a PVA-based film to uniaxial stretching typically has a thickness of several ten μm.

In order to attain the thickness reduction of the entire image display, it is studied to reduce a thickness of the optical laminate, particularly, a thickness of the polarizing film therein, to form a thinned polarizer. For example, a method of forming such a thinned polarizer includes a technique of preliminarily subjecting a laminate of a substrate and a PVA-based resin layer to in-air stretching at an elevated temperature, and then subjecting the layer to in-water stretching in a boric acid aqueous solution (see the following Patent Document 1). This technique is capable of stretching a laminate of a substrate and a PVA-based resin layer at a higher stretching ratio than before, and thereby forming a thinned polarizing film.

However, in the case where it is attempted to subject a laminate of a substrate and a PVA-based resin layer to stretching at a high stretching ratio in order to obtain a thinned polarizing film, if adhesion force between the substrate and the PVA-based resin layer is insufficiently low, the PVA-based resin layer is likely to be undesirably peeled off from the substrate and wound around a roll, during the stretching. Moreover, when the laminate is subjected to in-water stretching in a boric acid aqueous solution as mentioned above, breaking of the PVA-based resin layer is likely to occur due to foreign substances and gas bubbles in the layer, causing the PVA-based resin layer to be completely peeled off from the substrate. In addition, during conveyance of the formed thinned polarizer, the PVA-based resin layer is also likely to be peeled off from the substrate. The peel-off of the PVA-based resin layer from the substrate has been a factor causing deterioration in production yield of thinned polarizing films, optical laminates each comprising the thinned polarizing film, or image displays each using the optical laminate.

Therefore, there is a need for enhancing the adhesion force between the substrate and the PVA-based resin layer to prevent the PVA-based resin layer from being peeled off from the substrate during the in-air stretching, the in-water stretching, or the conveyance.

As a technique for enhancing the adhesion force between the substrate and the PVA-based resin layer, it is conceivable to subject the substrate to a corona treatment or the like before forming the PVA-based resin layer thereon, for example. As a technique to be performed in combination with or as an alternative to the above technique, it is conceivable to form an easy-adhesion layer, also called "primer coating", on the substrate (see the following Patent Document 2).

When these techniques are applied to a polarizing film formed at a conventional stretching ratio or with a conventional thickness, it is possible to enhance adhesion between a thermoplastic resin substrate and a PVA-based resin layer to some extent. However, when they are applied to a thinned polarizing film, the reality is that a sufficient result is not always obtained. Moreover, in the technique of forming an easy-adhesion layer on the substrate and then providing the PVA-based resin layer on the easy-adhesion layer, an appearance problem, such as lines due to repellence against a PVA-based resin solution during coating of the PVA-based resin layer, is observed.

LIST OF PRIOR ART DOCUMENTS

Patent Documents

Patent Document 1: JP 2012-073563 A
Patent Document 2: JP 2011-128486 A

SUMMARY OF THE INVENTION

Technical Problem

The present invention has been made to solve the above conventional problems, and a primary object thereof is to provide a polarizing film comprising a substrate and a PVA-based resin, wherein it has good adhesion between the substrate and the PVA-based resin to allow the PVA-based resin to become less likely to be peeled off from the substrate during stretching and/or conveyance, and exhibits excellent appearance, and an optical laminate with the polarizing film.

Solution to the Technical Problem

Based on a finding that adhesion between a substrate and a PVA-based resin layer can be enhanced to a level enough to be able to withstand a thinned polarizing film production process, by replacing, with a modified PVA, a specific rate of a PVA-based resin for use in the PVA-based resin layer to be provided on the substrate, the inventors have accomplished the present invention.

Specifically, the present invention provides a polarizing film which is obtained by providing a layer of a PVA-based resin on a substrate and stretching the substrate and the PVA-based resin layer together, wherein the PVA-based resin contains a modified PVA, and wherein the modified PVA exists in an amount allowing a modification rate with respect to the entire PVA-based resin to be in a range of 0.04 mol % to 1.4 mol %.

Preferably, in the polarizing film of the present invention, the modified PVA is an acetoacetyl-modified PVA.

Preferably, the modified PVA exists in an amount of 30 weight % or less, based on 100 weight % of a total amount of the PVA-based resin.

In one embodiment, the polarizing film of the present invention may be obtained by stretching the PVA-based resin layer provided on the substrate, at a stretching ratio of at least 5 times.

In one embodiment, the PVA-based resin layer after the stretching in the polarizing film of the present invention has a thickness of 10 μm or less.

The present invention further provides an optical laminate for an image display, which comprises the above polarizing film.

Effect of the Invention

The present invention can enhance adhesion force between the substrate and the PVA-based resin layer to prevent the PVA-based resin layer from being peeled off from the substrate during in-air stretching, in-water stretching, or conveyance, while obtaining excellent appearance, so that it becomes possible to improve production yield of thinned polarizing films, optical laminates each comprising the thinned polarizing film, or image displays each using the optical laminate.

DESCRIPTION OF EMBODIMENTS

The present invention will now be described based on preferred embodiments thereof. However, it is to be understood that the present invention is not limited to the embodiments I. Polarizing Film

Figure 1:
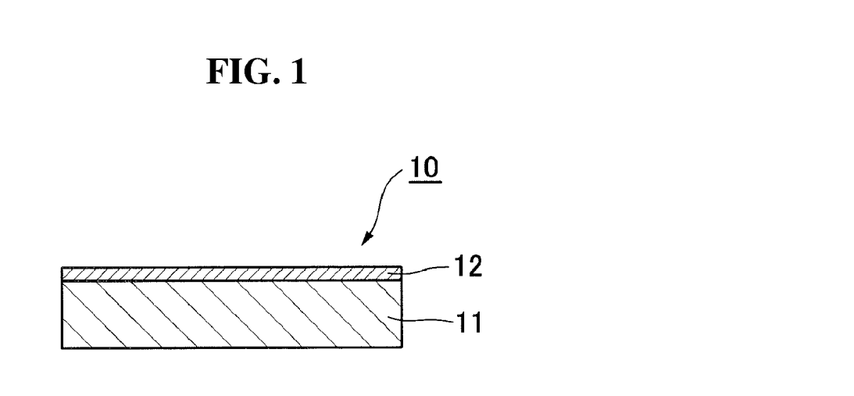
FIG. 1 is a schematic sectional view illustrating a polarizing film according to one preferred embodiment of the present invention.

FIG. 1 is a schematic sectional view illustrating a polarizing film according to one preferred embodiment of the present invention. The polarizing film 10 comprises a substrate 11 and a PVA-based resin layer 12, wherein it is formed by providing the PVA-based resin layer 12 on the substrate 11 and stretching the substrate 11 and the PVA-based resin layer 12 together. While a type of substrate, conditions for the stretching, etc., suitable for a polarizing film of the present invention, will be described in detail later in connection with a production method, it is preferable that the PVA-based resin layer provided on the substrate is stretched at a stretching ratio of at least 5 times.

A PVA-based resin for use in the polarizing film of the present invention contains a modified PVA. In the polarizing film of the present invention, the modified PVA exists in an amount allowing a modification rate with respect to the entire PVA-based resin to be in a range of 0.04 mol % to 1.4 mol %.

As used in this specification, the term "modification rate" means a rate of an acetoacetyl-modified vinyl monomer unit with respect to the entire PVA-based resin. An average molecular weight of an acetoacetyl-modified PVA is calculated from a saponification degree and a modification degree of the acetoacetyl-modified PVA, and a rate (mol %) of an acetoacetyl-modified vinyl monomer unit in the acetoacetyl-modified PVA is calculated. Similarly, an average molecular weight of a PVA (non-modified PVA) is calculated from a saponification degree of the PVA, and a rate (mol %) of the acetoacetyl-modified vinyl monomer unit with respect to the entire PVA-based resin is calculated from a mixing ratio.

As the modified PVA, it is preferable to use an acetoacetyl-modified PVA as represented by the following general formula:

As used in this specification, the term "modification degree" means a rate (%) of an acetoacetyl-modified vinyl monomer unit in an acetoacetyl-modified PVA, i.e., a rate of n, on the assumption that 1+m+n=100%, in the above general formula of the acetoacetyl-modified PVA. Further, it is preferable that the modified PVA exists in an amount of 30 weight % or less, based on 100 weight % of a total amount of the PVA-based resin.

As the acetoacetyl-modified PVA, a type having a saponification degree of 97 mol % or more may be suitably used, although not particularly limited thereto. Further, it is desirable that a pH value of the acetoacetyl-modified PVA to be used falls within a range of 3.5 to 5.5 as measured in the form of a 4% aqueous solution.

In the polarizing film of the present invention, the PVA-based resin layer after the stretching has a thickness, preferably, of 10 μm or less, more preferably, of 7 μm or less, further preferably, of 5 μm or less. When the polarizing film has a thickness of 10 μm or less, it can be called "thinned polarizing film". On the other hand, the polarizing film has a thickness, preferably, of 0.5 μm or more, more preferable, of 1.5 μm or more. An excessively small thickness is liable to cause deterioration in optical properties of a polarizing film to be obtained.

Preferably, the polarizing film exhibits an absorption dichroism at any wavelength ranging from 380 nm to 780 nm.

The polarizing film has a single transmittance, preferably, of 40.0% or more, more preferably, of 41.0% or more, further preferably, 42.0% or more.

The polarizing film has a polarization degree, preferably, of 99.8 or more, more preferably, 99.9% or more, further preferably, 99.95% or more.

The polarizing film of the present invention contains iodine in an amount, preferably, of 2.3 kcps or less, more preferably, of 2.2 kcps or less. On the other hand, preferably, the polarizing film contains iodine in an amount per unit thickness of 0.30 kcps or more. Preferably, the polarizing film contains a boric acid in an amount of 1.5 g/(400 mm×700 mm☐) or less.

As for how to use the above polarizing film, any suitable mode may be employed. Specifically, a combination of the PVA-based resin layer and the substrate integrated together may be used as a polarizing film. Alternatively, the PVA-based resin layer may be peeled off from the substrate after it subjected to a required treatment, and used as a polarizing film. Alternatively, the peeled PVA-based resin layer may be transferred to another member to use a resulting laminate as a polarizing film.

II. Optical Laminate

Figure 2A:
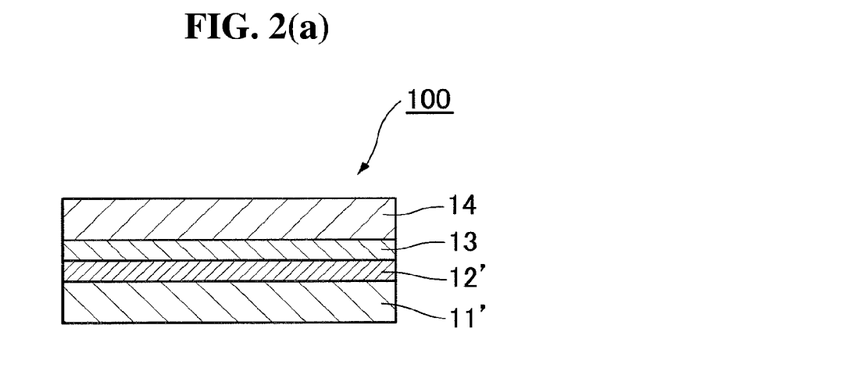
FIGS. 2(a) and 2(b) are schematic sectional views, respectively, illustrating two types of optical laminates according to preferred embodiments of the present invention.
Figure 2B:
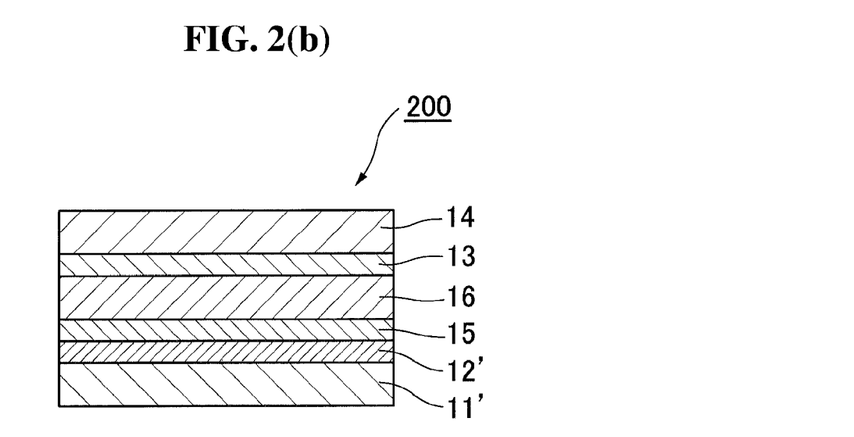

An optical laminate of the present invention comprises the above polarizing film. FIGS. 2(a) and 2(b) are schematic sectional views, respectively, illustrating two types of optical laminates according to preferred embodiments of the present invention. The optical laminate 100 comprises: a polarizing film composed of a substrate 11' and a PVA-based resin layer 12'; a pressure sensitive-adhesive layer 13; and a separator 14, which are laminated in this order. The optical laminate 200 comprises: a polarizing film composed of a substrate 11' and a PVA-based resin layer 12'; an adhesive layer 15; an optically functional film 16; a pressure sensitive-adhesive layer 13; and a separator 14, which are laminated in this order. In the two embodiments, the substrate 11' used for forming the polarizing film is used as an optical member without being peeled off from the PVA-based resin layer 12'. The substrate 11' can function, for example, as a protective film for the PVA-based resin layer 12'.

Figure 3A:
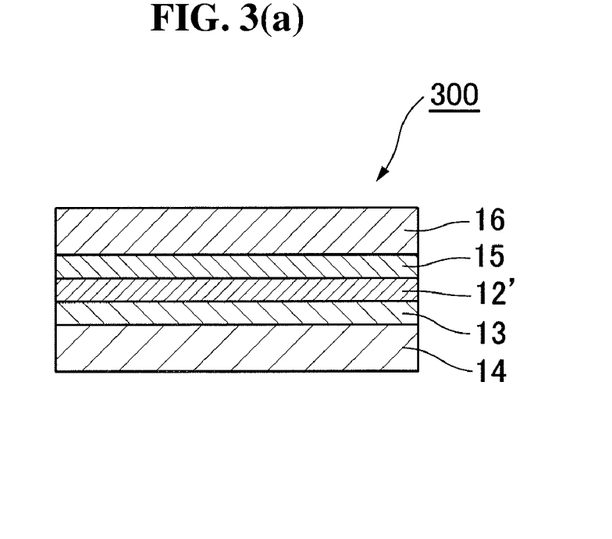
FIGS. 3(a) and 3(b) are schematic sectional views, respectively, illustrating two types of optical laminates according to other preferred embodiments of the present invention.
Figure 3B:
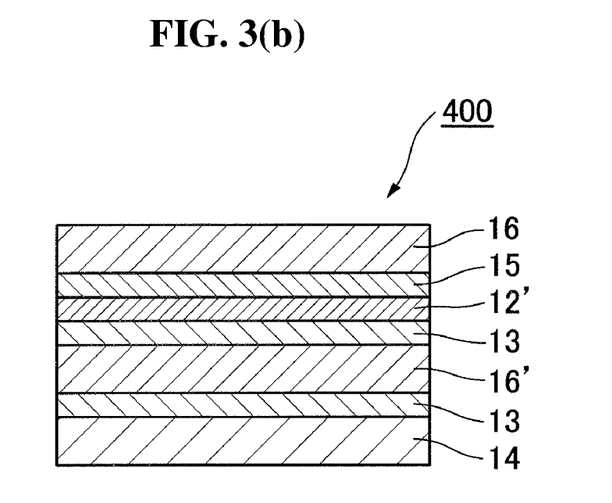

FIGS. 3(a) and 3(b) are schematic sectional views, respectively, illustrating two types of optical laminates according to other preferred embodiments of the present invention. The optical laminate 300 comprises: a separator 14; a pressure sensitive-adhesive layer 13; a PVA-based resin layer 12'; an adhesive layer 15; and an optically functional film 16, which are laminated in this order. In the optically functional film laminate 400, in addition to the configuration of the optical laminate 300, a second optically functional film 16' is provided between the PVA-based resin layer 12' and the separator 14 through respective pressure sensitive-adhesive layers 13. In the two embodiments, the substrate is removed.

Any suitable pressure sensitive-adhesive or adhesive layer may be used for lamination of the layers constituting the optical laminate of the present invention, without being limited to the illustrated embodiments. The pressure sensitive-adhesive layer is typically formed using an acrylic-based pressure sensitive-adhesive. The adhesive layer is typically formed using a vinyl alcohol-based adhesive. The optically functional film is a type capable of functioning, for example, as a polarizing film protective film or a retardation film.

III. Production Method

The polarizing film of the present invention can be produced by a production method which comprises: a step of forming a PVA-based resin layer on a substrate such as a thermoplastic resin substrate to form a laminate (Step A); a step of dyeing the PVA-based resin layer with iodine (Step B); and a step of subjecting the laminate to in-water stretching in a boric acid aqueous solution (Step C). Each of the steps will be described below.

(A-1) Step A

Referring to FIG. 1 again, the polarizing film 10 is formed by providing the PVA-based resin layer 12 on the substrate 11 and stretching the substrate 11 and the PVA-based resin layer 12 together. As for how to form the PVA-based resin layer 12, any suitable technique may be employed. Preferably, the PVA-based resin layer 12 is formed by applying a coating solution containing a PVA-based resin, onto the substrate 11, and drying the liquid.

As a material for the substrate, any suitable material such as a thermoplastic resin may be employed. In one embodiment, a non-crystalline (un-crystallized) polyethylene terephthalate-based resin is used as a material for the substrate. In particular, a non-crystallizable (hardly crystallizable) polyethylene terephthalate-based resin is preferably used. A specific example of non-crystallizable polyethylene terephthalate-based resin includes a copolymer additionally containing an isophthalic acid as a dicarboxylic acid, and a copolymer additionally containing cyclohexanedimethanol as glycol.

The above substrate is capable of absorbing water, in the aftermentioned Step C, wherein the water exerts a plasticizer-like action to allow the substrate to be plasticized. Thus, it becomes possible to significantly reduce a stretching stress and perform stretching at a higher stretching ratio. That is, this substrate exhibits better stretchability during in-water stretching than during in-air stretching. This makes it possible to form a polarizing film having excellent optical properties (e.g., polarization degree). The substrate has a water absorption rate, preferably, of 0.2% or more, more preferably, of 0.3% or more. On the other hand, the substrate has a water absorption rate, preferably, of 3.0% or less, more preferably, of 1.0% or less. For example, the use of the substrate having the above property makes it possible to prevent a problem that dimensional stability of a substrate is significantly reduced during production, causing deterioration in appearance of a polarizing film to be obtained. Further, it becomes possible to prevent an undesirable situation where a substrate is broken during the in-water stretching or a PVA-based resin layer is peeled off from a substrate. The water absorption rate is a value determined according to JIS K 7209.

Preferably, the substrate has a glass transition temperature (Tg) of 170° C. or less. The use of the substrate having the above property makes it possible to sufficiently ensure stretchability of the laminate while suppressing crystallization of the PVA-based resin layer. Further, in view of adequately achieving plasticization of the substrate based on water and the in-water stretching, the substrate preferably has a glass transition temperature (Tg) of 120° C. or less. In one embodiment, the substrate preferably has a glass transition temperature (Tg) of 60° C. or more. For example, the use of the substrate having the above property makes it possible to prevent a problem that a substrate is deformed (e.g., occurrence of irregularities, sagging or wrinkles) during the process of applying and drying a coating solution containing a PVA-based resin, thereby adequately forming the laminate. Further, it becomes possible to adequately perform stretching of the PVA-based resin layer at a suitable temperature (e.g., about 60° C.). The glass transition temperature of the substrate can be adjusted by adding, to a substrate material, a crystallizable material capable of introducing a modifying group into the substrate material, and hearing a resulting mixture. The glass transition temperature (Tg) is a value determined according to JIS K 7209.

In another embodiment, as long as the substrate is not deformed during the process of applying and drying a coating solution containing a PVA-based resin, the glass transition temperature of the substrate may be set to less than 60° C. In this case, the substrate material includes, for example, an olefin-based resin such as polypropylene or polymethylpentene.

The substrate before the stretching has a thickness, preferably, of 20 µm to 300 µm, more preferably, of 50 µm to 200 µm. If the thickness is less than 20 µm, formation of the PVA-based resin layer is liable to become difficult. On the other hand, if the thickness is greater than 300 µm, undesirable situations, for example, an extended time required for the substrate to absorb water, and an excessively large load required for stretching, are liable to occur in the Step B.

As the PVA-based resin, any suitable resin may be employed. For example, the PVA-based resin includes a polyvinyl alcohol and an ethylene-vinyl alcohol copolymer. The polyvinyl alcohol can be obtained by saponifying a polyvinyl acetate. The ethylene-vinyl alcohol copolymer can be obtained by saponifying an ethylene-vinyl acetate copolymer. The PVA-based resin has a saponification degree, generally, of 85 mol % to 100 mol %, preferably, of 95.0 mol % to 99.95 mol %, more preferably, of 99.0 mol % to 99.93 mol %. The saponification degree can be determined according to JIS K 6726-1994. The use of the PVA-based resin having the above saponification degree makes it possible to obtain a thinned polarizing film with excellent durability. An excessively high saponification degree is liable to cause gelation.

An average polymerization degree of the PVA-based resin may be appropriately selected depending on the intended purpose. The average polymerization degree is typically in the range of 1,000 to 10,000, preferably, in the range of 1,200 to 4,500, more preferably, in the range of 1,500 to 4,300. The average polymerization degree can be determined according to JIS K 6726-1994.

The coating solution is typically a solution obtained by dissolving the PVA-based resin in a solvent. For example, the solvent includes: water; dimethylsulfoxide; dimethylformamide; dimethylacetamide; N-methylpyrrolidone; various glycols; polyhydric alcohols, such as trimethylolpropane; and amines, such as ethylenediamine and diethylenetriamine. These solvents may be used independently or in the form of a combination of two or more of them. Among them, it is preferable to use water. A concentration of the PVA-based resin in the solution is preferably in the range of 3 weight parts to 20 weight parts with respect to 100 weight parts of the solvent. This resin concentration makes it possible to form a uniform coating film tightly adhering to the thermoplastic resin substrate.

An additive may be blended with the coating solution. For example, the additive includes a plasticizer and a surfactant. For example, the plasticizer includes polyhydric alcohols, such as ethylene glycol and glycerin. For example, the surfactant includes nonionic surfactants. These additives may be used for the purpose of further enhancing the uniformity, dyeability, or stretchability of a PVA-based resin layer to be obtained.

As for how to apply the coating solution, any suitable method may be employed. For example, the method includes a roll coating method, a spin coating method, a wire bar coating method, a dip coating method, a die coating method, a curtain coating method, a spray coating method, and a knife coating method (comma coating method, etc.).

Preferably, the coating liquid is applied and dried at a temperature of 50° C. or more.

The PVA-based resin layer before the stretching preferably has a thickness of 20 µm or less. On the other hand, the PVA-based resin layer before the stretching has a thickness, preferably, of 20 µm or more, more preferably, of 4 µm or more. An excessively small thickness is liable to cause deterioration in optical properties of a thinned polarizing film to be obtained.

Before forming the PVA-based resin layer, the substrate may be subjected to a surface treatment (e.g., corona treatment), or an easy-adhesion layer may be formed on the substrate. These treatments make it possible to enhance adhesion between the substrate and the PVA-based resin layer.

(A-2) Step B

In the Step B, the PVA-based resin layer is dyed with iodine. Specifically, the dyeing is performed by causing the PVA-based resin layer to adsorb iodine. For example, a method for the adsorption includes: a method which comprises immersing the PVA-based resin layer (laminate) in a dyeing solution containing iodine; a method which comprises applying the dyeing solution to the PVA-based resin layer; and a method which comprises spraying the dyeing solution onto the PVA-based resin layer. Among them, it is preferable to employ the method which comprises immersing the laminate in the dyeing solution, because this method is capable of allowing iodine to be adsorbed in the PVA-based resin layer.

Preferably, the dyeing solution is an iodine aqueous solution. Preferably, iodine is blended with water in an amount of 0.1 weight parts to 0.5 weight parts with respect to 100 weight parts of water. In order to enhance solubility of iodine in water, it is preferable to blend an iodide with the iodine aqueous solution. For example, the iodide includes potassium iodide, lithium iodide, sodium iodide, zinc iodide, aluminum iodide, lead iodide, copper iodide, barium iodide, calcium iodide, tin iodide, and titanium iodide. Among them, it is preferable to use potassium iodide. The iodide is blended with water in an amount, preferably, of 0.02 weight parts to 20 weight parts, more preferably, of 0.1 weight parts to 10 weight parts, with respect to 100 weight parts of water. In order to suppress dissolution of the PVA-based resin, a temperature of the dyeing solution during the dyeing is preferably set in the range of 20° C. to 50° C. When the PVA-based resin layer is immersed in the dyeing solution, an immersion time is preferably set in the range of 5 seconds to 5 minutes in order to ensure a transmittance of the PVA-based resin layer. Further, the dyeing conditions (concentration, solution temperature, and immersion time) may be set in such a manner that the polarization degree or single transmittance of a polarizing film to be finally obtained falls within a given range. In one embodiment, the immersion time is set in such a manner that the polarization degree of a polarizing film to be finally obtained becomes 99.98% or more. In another embodiment, the immersion time is set in such a manner that the single transmittance of the polarizing film to be finally obtained falls within the range of 40% to 44%.

Preferably, the Step B is performed before the aftermentioned Step C.

(A-3) Step C

In the Step C, the laminate is subjected to in-water stretching (stretching in a boric acid aqueous solution). The in-water stretching is capable of perform stretching at a temperature less than glass transition temperatures of the substrate and the PVA-based resin layer (typically, about 80° C.), and stretching the PVA-based resin layer at a high stretching ratio while suppressing crystallization thereof. Thus, it becomes possible to form a thinned polarizing film having excellent optical properties (e.g., polarization degree).

As for how to stretch the laminate, any suitable stretching mode may be employed. Specifically, the stretching mode may be fixed-end stretching or may be free-end stretching (e.g., a mode in which the laminate is subjected to uniaxial stretching while passing between two rolls having different circumferential velocities). The stretching of the laminate may be performed in a single-stage manner or may be performed in a multi-stage manner. When the stretching is performed in a multi-stage manner, an aftermentioned stretching ratio is a product of respective stretching ratios in the stages.

Preferably, the in-water stretching is performed under the condition that the laminate is immersed in a boric acid aqueous solution (in-boric-acid-solution stretching). The use of the boric acid aqueous solution as a stretching bath makes it possible to give, to the PVA-based resin layer, rigidity enough to withstand a tension to be imposed during the stretching, and water resistance enough to prevent dissolution in water. Specifically, a boric acid is capable of producing a tetrahydroxyborate anion in an aqueous solution to form a cross-linkage with the PVA-based resin by hydrogen bond. Thus, it becomes possible to give rigidity and water resistance to the PVA-based resin layer so as to allow the PVA-based resin layer to be adequately stretched, thereby forming a thinned polarizing film having excellent optical properties (e.g., polarization degree).

Preferably, the boric acid aqueous solution is obtained by dissolving a boric acid and/or a borate in water as a solvent. Preferably, a concentration of the boric acid is set in the range of 1 weight part to 10 weight parts with respect to 100 weight parts of water. The concentration of the boric acid set to 1 weight part or more makes it possible to effectively suppress dissolution of the PVA-based resin layer, thereby forming a thinned polarizing film having further enhanced optical properties. As well as a boric acid and a borate, an aqueous solution obtained by dissolving: a boron compound such as borax; glyoxal; and glutaraldehyde, may also be used.

In the case where iodine is preliminarily absorbed in the PVA-based resin layer through the dyeing step (Step B), it is preferable to blend an iodide with the stretching bath (boric acid aqueous solution). The blending of the iodide makes it possible to suppress elution of the iodine absorbed in the PVA-based resin layer. A specific example of the iodide is as mentioned above. A concentration of the iodide is set preferably in the range of 0.05 weight parts to 15 weight parts, more preferably, in the range of 0.5 weight parts to 8 weight parts, with respect to 100 weight parts of water.

A stretching temperature (temperature of the stretching bath) is set preferably in the range of 40° C. to 85° C., more preferably, in the range of 50° C. to 85° C. A temperature falling within this range makes it possible to stretch the PVA-based resin layer at a high stretching ratio while suppressing the dissolution of the PVA-based resin layer. As mentioned above, in one embodiment, the glass transition temperature (Tg) of the substrate is preferably set to 60° C. or more, in relationship with the formation of the PVA-based resin layer. In this case, if the stretching temperature is less than 40° C., the stretching is liable to become unable to be adequately performed, even considering plasticization of the substrate by water. On the other hand, along with an increase in temperature of the stretching bath, the solubility of the PVA-based resin layer becomes higher, which is liable to cause failing to obtain excellent optical properties. The immersion time of the laminate in the stretching bath is preferably set in the range of 15 seconds to 5 minutes.

The employment of the in-water stretching (in-boric-acid-solution stretching) makes it possible to perform the stretching at a high stretching ratio and form a thinned polarizing film having excellent optical properties (e.g., polarization degree). Specifically, a maximum stretching ratio is preferably set to 5.0 times or more with respect to an original length of the laminate. As used in this specification, the term "maximum stretching ratio" means a stretching ratio just before breaking of the laminate, more specifically, a value less than a separately ascertained stretching ratio causing breaking of the laminate by 0.2.

(A-4) Additional Steps

In addition to the Step A, the Step B and the Step C, the production method for the polarizing film of the present invention may include an additional step. For example, the additional step includes an insolubilization step, a cross-linking step, a stretching step other than the Step C, a washing step, and a drying (moisture percentage adjustment) step. The additional step may be performed at any suitable timing.

The insolubilization step is typically performed by immersing the PVA-based resin layer in a boric acid aqueous solution. In this step, the PVA-based resin layer is subjected to an insolubilization treatment so as to give water resistance to the PVA-based resin layer. Preferably, a concentration of the boric acid aqueous solution is set in the range of 1 weight part to 4 weight parts respect to 100 weight parts of water. Preferably, a temperature of an insolubilizing bath (boric acid aqueous solution) is set in the range of 20° C. to 40° C. Preferably, the insolubilization step is performed after forming the laminate and before the Step B or the Step C.

The cross-linking step is typically performed by immersing the PVA-based resin layer in a boric acid aqueous solution. In this step, the PVA-based resin layer is subjected to a cross-linking treatment so as to give water resistance to the PVA-based resin layer. Preferably, a concentration of the boric acid aqueous solution is set in the range of 1 weight part to 4 weight parts with respect to 100 weight parts of water. Further, in the case where the cross-linking step is performed after the dyeing step, it is preferable to further blend an iodide therewith. The blending of the iodide makes it possible to suppress elution of the iodine absorbed in the PVA-based resin layer. Preferably, the iodide is blended with water in an amount of 1 weight part to 5 weight parts with respect to 100 weight parts of water. A specific example of the iodide is as mentioned above. Preferably, a temperature of the cross-linking bath (boric acid aqueous solution of) is set in the range of 20° C. to 50° C. Preferably, the cross-linking step is performed before the Step C. In a preferred embodiment, the Step B, the cross-linking step, and the Step C are performed in this order.

For example, the stretching step other than the Step C includes a step of subjecting the laminate to in-air stretching at an elevated temperature (e.g., 95° C. or more). Preferably, the in-air stretching step is performed before the in-boric-acid-solution stretching (Step C) and the dyeing step. The in-air stretching step can be regarded as a preliminarily or auxiliary stretching for the in-boric-acid-solution stretching, and will hereinafter be referred to as "auxiliary in-air stretching".

The combination with the auxiliary in-air stretching has a potential of allowing the laminate to be stretched at a higher ratio. Thus, it becomes possible to form a thinned polarizing film having further enhanced optical properties (e.g., polarization degree). For example, in the case where a polyethylene terephthalate-based resin is used as a material for the substrate, as compared to stretching consisting only of the in-boric-acid-solution stretching, the combination of the auxiliary in-air stretching and the in-boric-acid-solution stretching makes it possible to stretch the resin substrate while suppressing molecular orientation in the substrate. As an orientation property of the substrate is enhanced, a stretching tension thereof becomes larger, causing difficulty in stable stretching or breaking of the substrate. For this reason, the stretching is performed while suppressing the molecular orientation in the substrate. This makes it possible to stretch the laminate at a higher stretching ratio.

Further, the combination with the auxiliary in-air stretching makes it possible to enhance an orientation property of the PVA-based resin and thereby enhance the orientation property of the PVA-based resin even after the in-boric-acid-solution stretching. Specifically, it is assumed that the orientation property of the PVA-based resin is preliminarily enhanced by the auxiliary in-air stretching, which facilitates cross-linking between the PVA-based resin and the boric acid during the in-boric-acid-solution stretching, to allow the stretching to be performed in a state in which the boric acid serves as a node, whereby the orientation property of the PVA-based resin can be enhanced even after the in-boric-acid-solution stretching. Thus, it becomes possible to form a thinned polarizing film having excellent optical properties (e.g., polarization degree).

A stretching mode for the auxiliary in-air stretching may be fixed-end stretching, or may be free-end stretching (e.g., a mode in which the laminate is subjected to uniaxial stretching while passing between two rolls having different circumferential velocities), as with the Step C. Further, the stretching may be performed in a single-stage manner or may be performed in a multi-stage manner. When the stretching is performed in a multi-stage manner, an after-mentioned stretching ratio is a product of respective stretching ratios in the stages. Preferably, a stretching direction in this step is set to approximately the same direction as that in the Step C.

Preferably, a stretching ratio in the auxiliary in-air stretching is set to 3.5 times or less. Preferably, a stretching temperature in the auxiliary in-air stretching is set to be equal to or greater than the glass transition temperature of the PVA-based resin. Preferably, a stretching temperature is set in the range of 95° C. to 150° C. In the case where the in-air stretching and the in-boric-acid-solution stretching are combined together, the maximum stretching ratio is set preferably to 5.0 times or more, more preferably, to 5.5 times or more, more preferably, to 6.0 times or more, with respect to the original length of the laminate.

The washing step is typically performed by immersing the PVA-based resin layer in a potassium iodide aqueous solution. Preferably, a drying temperature in the drying step is set in the range of 30° C. to 100° C.

Figure 4:
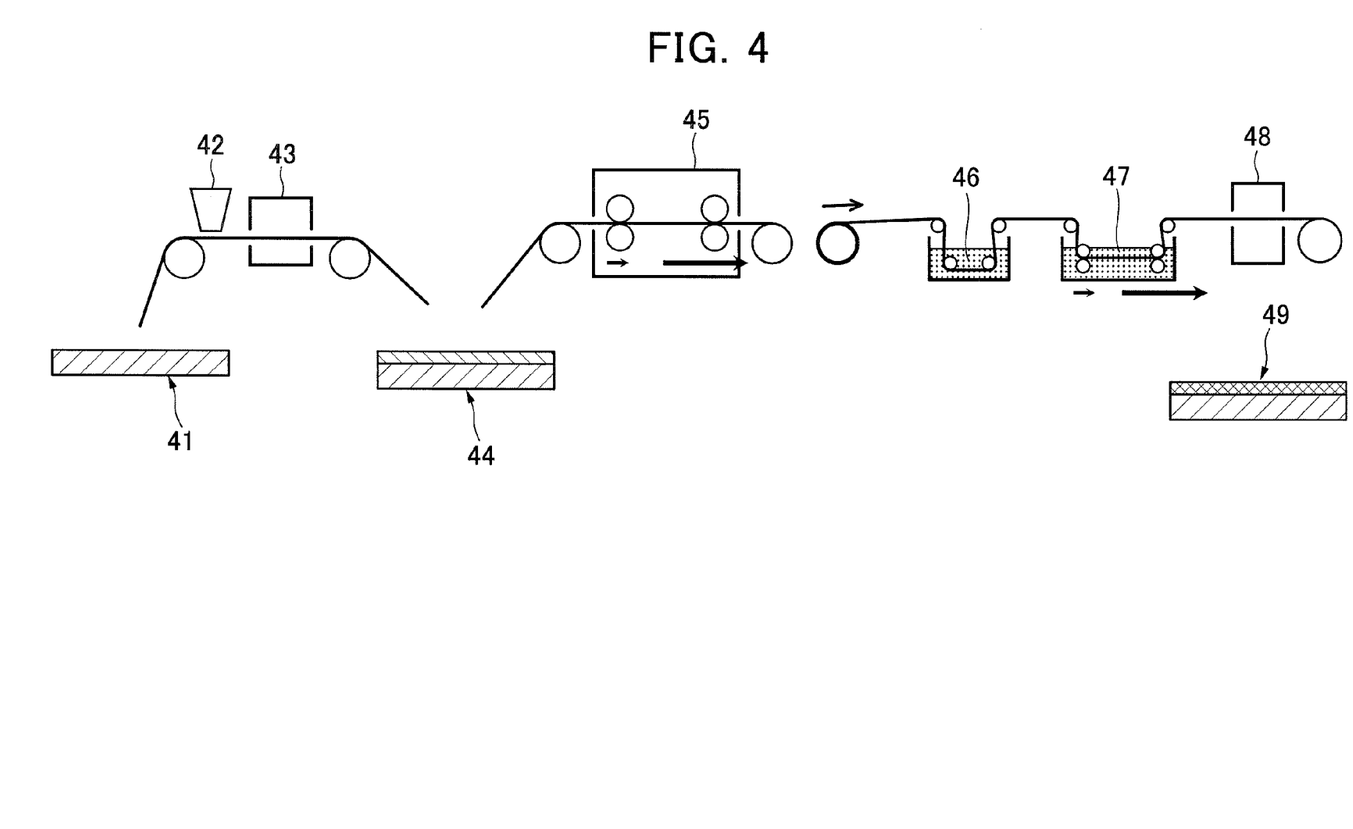
FIG. 4 is a schematic diagram illustrating one example of a production method for the polarizing film of the present invention.

FIG. 4 is a schematic diagram illustrating one example of the production method for the polarizing film of the present invention.

A polyvinyl alcohol-based resin aqueous solution is applied to a thermoplastic resin substrate 41 by using coater 42, and dried by an oven 43 to form a laminate 44 in which a polyvinyl alcohol-based resin layer is formed on the thermoplastic resin substrate. Then, the laminate 44 is subjected to in-air stretching at an elevated temperature in an oven 45 to form a stretched intermediate product comprising a stretched thermoplastic resin substrate and a molecularly oriented polyvinyl alcohol-based resin layer. Then, the stretched intermediate product is immersed in a dichroic material-containing aqueous solution as a dyeing bath 46 to cause the dichroic material to be absorbed in the stretched intermediate product, thereby forming a dyed intermediate product comprising a polyvinyl alcohol-based resin layer having a molecularly oriented dichroic material. Then, the dyed intermediate product is subjected to in-boric-acid-solution stretching in an in-boric-acid-solution stretching bath 47, and dried by an oven 48. In this manner, a polarizing film 49 can be formed which comprises a polyvinyl alcohol-based resin layer with a molecularly oriented dichroic material and having a thickness, preferably, of 10 μm or less.

EXAMPLES

The present invention will be described in detail below, based on examples. However, the present invention is not limited by these examples. An evaluation method for each evaluation item for polarizing films obtained in Inventive Examples and Comparative Examples is as follows.

1. Adhesion

After forming polarizing films, each of the polarizing film was subjected to stretching in a boric acid aqueous solution to stretch a PVA-based resin layer thereof until breaking of the PVA-based resin layer. In this case, a polarizing film whose PVA-based resin layer was peeled off from a substrate in connection with the breaking was evaluated as "x", and a polarizing film whose PVA-based resin layer was not peeled off from a substrate even after the breaking was evaluated as "○".

2. Appearance

It was ascertained whether dissolution of a PVA-based resin layer occurs during stretching in a boric acid aqueous solution in a process of forming a polarizing film, and whether unevenness such as lines is observed when visually checking a state of an obtained polarizing film. In this case, when none of the defects occurred, the appearance was evaluated as "○".

Inventive Example 1

An A-PET (Amorphous-Polyethylene Terephthalate) film (produced by Mitsubishi Plastics, Inc., trade name: NOVA-CLEAR SH 046, thickness: 200 μm) was employed as a substrate, and a surface of the film was subjected to a corona treatment (58 W/m²/min). Further, a PVA (polymerization degree: 4200, saponification degree: 99.2%) added with 1 wt % of acetoacetyl-modified PVA (produced by Nippon Synthetic Chemical Industry Co., Ltd., trade name: Gohsefimer Z200 (polymerization degree: 1200, saponification degree: 99.0% or more, acetoacetyl-modification degree: 4.6%)) was used to prepare 5.5 wt % of coating solution of a PVA-based resin having a modification rate of 0.04 mol %. Then, the coating solution was applied using an applicator to the substrate to allow a film thickness after drying to become 10 and subjected to hot-air drying under an atmosphere at 60° C. for 10 minutes to form a laminate in which a layer of the PVA-based resin is provided on the substrate.

The modification rate was calculated in the following manner. An average molecular weight of the acetoacetyl-modified PVA was calculated (Mw=48.26) from the saponification degree (99.0%) and the modification degree (4.6%) of the acetoacetyl-modified PVA, and a rate of an acetoacetyl-modified vinyl monomer unit in the acetoacetyl-modified PVA is calculated (0.00953 mol). Similarly, an average molecular weight of the PVA (non-modified PVA) is calculated (Mw=44.34) from the saponification degree (99.2%) of the PVA, and a rate of the acetoacetyl-modified vinyl monomer unit with respect to the entire PVA-based resin is calculated (0.000423 mol) from the mixing ratio (1.0 wt %: addition). This is expressed as 0.0423 mol % when converted to percentage.

Then, this laminate was subjected to free-end stretching in air at 130° C. at a stretching ratio of 1.8 times to form a stretched laminate. Then, the stretched laminate was immersed in a boric acid aqueous solution at a temperature of 30° C. for 30 seconds to perform a step of insolubilizing a molecularly oriented PVA layer comprised in the stretched laminate. The boric acid aqueous solution in this step was prepared to contain a boric acid in an amount of 3 weight % with respect to 100 weight % of water. The stretched laminate was subjected to dyeing to form a dyed laminate. The dyed laminate was formed by immersing the stretched laminate in a dyeing solution containing iodine and potassium iodide and maintained at a temperature of 30° C. for an arbitrary time, in such a manner that a single transmittance of a PVA layer constituting a highly functional polarizing film to be finally formed falls with the range of 40 to 44%, so as to cause iodine to be absorbed in the PVA layer comprised in the stretched laminate. In this step, the dyeing solution was prepared using water as a solvent to allow an iodine concentration and a potassium iodide concentration to fall with the range of 0.08 to 0.25 weight %, and the range of 0.56 to 1.75 weight %, respectively. A concentration ratio of iodine to potassium iodide is 1:7. Then, a step of subjecting the PVA molecules in the PVA layer absorbing iodine to a cross-linking treatment was performed while immersing the dyed laminate in a boric acid cross-linking aqueous solution at 30° C. for 60 seconds. The boric acid cross-linking aqueous solution in this step was prepared by allowing a boric acid to be contained in an amount of 3 weight % with respect to 100 weight % of water, and allowing potassium iodide to be contained in an amount of 3 weight % with respect to 100 weight % of water. Further, an obtained dyed laminate was stretched in a boric acid aqueous solution at a stretching temperature of 70° C., at a stretching ratio of 3.3 times in the same direction as that during the previous in-air stretching to obtain a sample polarizing film stretched at a final (total) stretching ratio of 5.94 times. The optical film laminate was taken out of the boric acid aqueous solution, and a boric acid attaching on a surface of the PVA layer was washed by an aqueous solution containing 4 weight % of potassium iodide with respect to 100 weight % of water. The washed optical film laminate was dried through a drying step using hot air at 60° C.

An appearance of the obtained polarizing film was visually checked.

Further, the polarizing film was stretched in a boric acid aqueous solution until breaking of the PVA-based resin layer, and adhesion of the PVA-based resin layer with respect to the substrate was evaluated.

Inventive Example 2

Except that an amount of the acetoacetyl-modified PVA (produced by Nippon Synthetic Chemical Industry Co., Ltd., trade name: Gohsefimer Z200 (polymerization degree: 1200, saponification degree: 99.0% or more, acetoacetyl-modification degree: 4.6%)) to be added was changed to 5 wt %, a sample was formed and evaluated in the same manner as that in Inventive Example 1.

Inventive Example 3

Except that an amount of the acetoacetyl-modified PVA (produced by Nippon Synthetic Chemical Industry Co., Ltd., trade name: Gohsefimer Z200 (polymerization degree: 1200, saponification degree: 99.0% or more, acetoacetyl-modification degree: 4.6%)) to be added was changed to 10 wt %, a sample was formed and evaluated in the same manner as that in Inventive Example 1.

Inventive Example 4

Except that an amount of the acetoacetyl-modified PVA (produced by Nippon Synthetic Chemical Industry Co., Ltd., trade name: Gohsefimer Z200 (polymerization degree: 1200, saponification degree: 99.0% or more, acetoacetyl-modification degree: 4.6%)) to be added was changed to 30 wt %, a sample was formed and evaluated in the same manner as that in Inventive Example 1.

Inventive Example 5

Except that the acetoacetyl-modified PVA to be added was changed to another type (produced by Nippon Synthetic Chemical Industry Co., Ltd., trade name: Gohsefimer Z10 (polymerization degree: 2200, saponification degree: 97.5 to 98.5%, acetoacetyl-modification degree: 4.6%)), a sample was formed and evaluated in the same manner as that in Inventive Example 3.

Inventive Example 6

The A-PET (Amorphous-Polyethylene Terephthalate) film (produced by Mitsubishi Plastics, Inc., trade name: NOVACLEAR SH 046, thickness: 200 µm) was subjected to a corona treatment (58 W/m$^2$/min), and a PVA (polymerization degree: 4200, saponification degree: 99.2%) added with 10 wt % of acetoacetyl-modified PVA (produced by Nippon Synthetic Chemical Industry Co., Ltd., trade name: Gohsefimer Z410 (polymerization degree: 2200, saponification degree: 97.5 to 98.5%, acetoacetyl-modification degree: 4.6%)) was applied to allow a film thickness after drying to become 10 µm, and dried at 60° C. for 10 minutes to form a laminate. Then, the laminate was stretched in a boric acid aqueous solution at a temperature of 60° C. at a stretching ratio of 5.0 times, and an appearance of an obtained film was checked. Further, the film was stretched in a boric acid aqueous solution until breaking of the PVA, and adhesion of the PVA was evaluated.

Comparative Example 1

The A-PET (Amorphous-Polyethylene Terephthalate) film (produced by Mitsubishi Plastics, Inc., trade name: NOVACLEAR SH 046, thickness: 200 µm) was subjected to a corona treatment (58 W/m$^2$/min), and a PVA (polymerization degree: 4200, saponification degree: 99.2%) was applied to allow a film thickness after drying to become 10 µm, and dried at 60° C. for 10 minutes to form a laminate. Then, the laminate was subjected to free-end stretching in air at 130° C. at a stretching ratio of 1.8 times to form a stretched laminate. Then, the stretched laminate was subjected to dyeing to form a dyed laminate, and the dyed laminate was stretched in a boric acid aqueous solution at a stretching temperature of 70° C., at a stretching ratio of 3.3 times in the same direction as that during the previous in-air stretching. Then, an appearance of an obtained film was checked. Further, the film was stretched in a boric acid aqueous solution until breaking of the PVA, and adhesion of the PVA was evaluated.

Comparative Example 2

Except that an amount of the acetoacetyl-modified PVA (produced by Nippon Synthetic Chemical Industry Co., Ltd., trade name: Gohsefimer Z200 (polymerization degree: 1200, saponification degree: 99.0% or more, acetoacetyl-modification degree: 4.6%)) to be added was changed to 40 wt %, a sample was formed and evaluated in the same manner as that in Inventive Example 1.

Comparative Example 3

The A-PET (Amorphous-Polyethylene Terephthalate) film (produced by Mitsubishi Plastics, Inc., trade name: NOVACLEAR SH 046, thickness: 200 μm) was subjected to a corona treatment (58 W/m²/min), and an aqueous solution of 5 wt % acetoacetyl-modified PVA (produced by Nippon Synthetic Chemical Industry Co., Ltd., trade name: Gohsefimer Z200 (polymerization degree: 1200, saponification degree: 99.0% or more, acetoacetyl-modification degree: 4.6%)) was applied to allow a film thickness after drying to become 10 μm, and dried at 60° C. for 10 minutes to form a laminate. Then, the laminate was subjected to free-end stretching in air at 130° C. at a stretching ratio of 1.8 times to form a stretched laminate. Then, the stretched laminate was subjected to dyeing to form a dyed laminate, and the dyed laminate was stretched in a boric acid aqueous solution at a stretching temperature of 70° C., at a stretching ratio of 3.3 times in the same direction as that during the previous in-air stretching. Then, an appearance of an obtained film was checked. Further, the film was stretched in a boric acid aqueous solution until breaking of the PVA, and adhesion of the PVA was evaluated.

Example 3 where an acetoacetyl-modified PVA is used as an easy-adhesion layer (primer), dissolution of the PVA during the in-boric-acid-solution stretching, or an appearance problem such as lines due to repellence against the PVA solution during coating of the PVA, was observed.

EXPLANATION OF CODES

10: polarizing film
11: substrate
12: PVA-based resin layer
13: pressure sensitive-adhesive layer
14: separator
15: adhesive layer
16: optically functional film
41: thermoplastic resin substrate
42: coater
43, 45, 48: oven
44: laminate
46: dyeing bath
47: in-boric-acid-solution stretching bath
49: polarizing film

What is claimed is:
1. An optical laminate comprising a substrate and a polarizing film obtained by providing a layer of a PVA-based resin on the substrate and stretching the substrate and the PVA-based resin layer together, wherein the PVA-based resin contains a modified PVA, the modified PVA existing in an amount allowing a modification rate, that is, a rate of an acetoacetyl-modified vinyl monomer unit with respect to the entire PVA-based resin to be in a range of 0.04 mol % to 1.4 mol %; wherein the layer of the PVA-based resin is provided directly on the substrate; and wherein the modified PVA exists in an amount of 30 weight % or less, based on the total amount of the PVA-based resin.

2. The optical laminate as defined in claim 1, wherein the substrate is a polyethylene terephthalate-based resin; and wherein the modified PVA is an acetoacetyl-modified PVA.

TABLE 1

|  | Modified PVA | | | |
| --- | --- | --- | --- | --- |
|  | Type | Amount of addition (wt %) | Modification rate (mol %) | Adhesion | Appearance |
| Inventive Example 1 | Z200 | 1 | 0.04 | ○ | ○ |
| Inventive Example 2 | Z200 | 5 | 0.2 | ○ | ○ |
| Inventive Example 3 | Z200 | 10 | 0.4 | ○ | ○ |
| Inventive Example 4 | Z200 | 30 | 1.3 | ○ | ○ |
| Inventive Example 5 | Z410 | 10 | 0.4 | ○ | ○ |
| Inventive Example 6 | Z410 | 10 | 0.4 | ○ | ○ |
| Comparative Example 1 | — | — | — | X | ○ |
| Comparative Example 2 | Z200 | 40 | 1.7 | ○ | X (dissolution of PVA) |
| Comparative Example 3 | Z200 | primer | | ○ | X (occurrence of repellence) |

As is evidenced from the results of Inventive Examples 1 to 6, it was verified that the addition of an appropriate amount of acetoacetyl-modified PVA as in the present invention makes it possible to satisfy both of adhesion and appearance.

In contrast, in Comparative Example 1 where no acetoacetyl-modified PVA is added, peel-off of the PVA was observed in the evaluation on adhesion. Further, in Comparative Example 2 where an excessively large amount of acetoacetyl-modified PVA is added, and Comparative 3. The optical laminate as defined in claim 2, wherein the PVA-based resin layer after the stretching has a thickness of 10 μm or less.

4. The optical laminate as defined in claim 1, which is obtained by stretching the PVA-based resin layer provided on the substrate, at a stretching ratio of at least 5 times.

5. The optical laminate as defined in claim 1, wherein the PVA-based resin layer after the stretching has a thickness of 10 μm or less.

6. An image display, comprising an optical laminate comprising a substrate and a polarizing film obtained by providing a layer of a PVA-based resin on the substrate and stretching the substrate and the PVA-based resin layer together, wherein the PVA-based resin contains a modified PVA, the modified PVA existing in an amount allowing a modification rate, that is, a rate of an acetoacetyl-modified vinyl monomer unit with respect to the entire PVA-based resin to be in a range of 0.04 mol % to 1.4 mol %; wherein the layer of the PVA-based resin is provided directly on the substrate; and wherein the modified PVA exists in an amount of 30 weight % or less, based on the total amount of the PVA-based resin.

7. The optical laminate as defined in claim 6, which is obtained by stretching the PVA-based resin layer provided on the substrate, at a stretching ratio of at least 5 times.

8. An image display, comprising an optical laminate comprising a substrate and a polarizing film obtained by providing a layer of a PVA-based resin on the substrate and stretching the substrate and the PVA-based resin layer together, wherein the PVA-based resin contains a modified PVA, the modified PVA existing in an amount allowing a modification rate, that is, a rate of an acetoacetyl-modified vinyl monomer unit with respect to the entire PVA-based resin to be in a range of 0.04 mol % to 1.4 mol %; wherein the layer of the PVA-based resin is provided directly on the substrate; wherein the modified PVA exists in an amount of 30 weight % or less, based on the total amount of the PVA-based resin; and wherein the substrate is a polyethylene terephthalate-based resin; and wherein the modified PVA is an acetoacetyl-modified PVA.

9. The optical laminate as defined in claim 8, which is obtained by stretching the PVA-based resin layer provided on the substrate, at a stretching ratio of at least 5 times.

* * * * *